United States Patent [19]
Pfeiffer

[11] Patent Number: 5,462,717
[45] Date of Patent: Oct. 31, 1995

[54] PROCESSES USING FLUIDIZED SOLIDS AND APPARATUS FOR CARRYING OUT SUCH PROCESSES

[76] Inventor: Robert W. Pfeiffer, 3 Hidden Spring La., Rye, N.Y. 10580

[21] Appl. No.: 245,461

[22] Filed: May 17, 1994

Related U.S. Application Data

[63] Continuation-in-part of Ser. No. 940,025, Sep. 3, 1992, abandoned, which is a continuation-in-part of Ser. No. 746,066, Aug. 12, 1991, abandoned, which is a continuation of Ser. No. 406,350, Sep. 13, 1989, abandoned.

[51] Int. Cl.⁶ .............................. B01J 8/18; B01J 20/34; F27B 15/14; F28D 7/00
[52] U.S. Cl. .......................... 422/146; 422/139; 422/144; 422/145; 422/200; 422/201; 422/205; 208/113; 502/41; 502/42; 502/44
[58] Field of Search ...................... 422/144, 145, 422/146, 143, 200, 201, 205, 139; 165/104.16; 208/113; 502/41, 42, 44

[56] References Cited

U.S. PATENT DOCUMENTS

| | | | |
|---|---|---|---|
| 2,383,636 | 8/1945 | Wurth | 422/146 |
| 2,434,567 | 1/1948 | Jahnig et al. | 208/155 |
| 2,589,124 | 3/1952 | Packie | 208/164 |
| 2,819,951 | 1/1958 | Medlin et al. | 422/146 X |
| 2,856,351 | 10/1958 | Welty, Jr. et al. | 208/140 |
| 2,858,279 | 10/1958 | Drews | 502/44 |
| 2,989,382 | 6/1961 | Voorhies et al. | 422/144 |
| 3,563,911 | 2/1971 | Pfeiffer et al. | 502/43 |
| 3,661,800 | 5/1972 | Pfeifffer et al. | 502/43 |
| 4,039,290 | 8/1977 | Inada et al. | |
| 4,268,359 | 5/1981 | Rammler et al. | 422/146 |
| 4,313,848 | 2/1982 | Scott | 422/144 X |
| 4,388,218 | 6/1983 | Rowe | 422/142 |
| 4,511,434 | 4/1985 | Vasalos | 422/142 X |
| 4,557,904 | 12/1985 | Brod et al. | 422/146 |
| 4,668,802 | 5/1987 | Contractor | 549/249 |

*Primary Examiner*—Robert J. Warden
*Assistant Examiner*—Christopher Y. Kim
*Attorney, Agent, or Firm*—Victor E. Libert; Frederick A. Spaeth

[57] ABSTRACT

Apparatus and processes are disclosed for carrying out chemical reactions of the type in which a fluidized particulate solid is contacted with reactants in a reaction vessel or conduit and then separated from the reactant products and regenerated in a regeneration process, such as combusting the carbonaceous deposit which accretes on fluid catalytic cracking catalyst particles. The regeneration reaction may change the temperature of the regenerated catalyst particles and in such case it is often required to subject the particles to heat exchange to provide them at a temperature suitable for recirculation to the reaction zone. The processes and apparatus of the invention essentially provide for dividing the fluidized solids regeneration bed into an uppermost bed zone and at least one lower bed zone by a horizontal occlusion zone disposed at a vertically intermediate portion of the bed. The regeneration is fully or partially carried out in the uppermost bed zone, and further regeneration of and/or heat exchange with the regenerated particles is carried out in the occlusion zone and/or the lower bed zone. The intermediate occlusion zone inhibits backmixing of the fluidized particles, thereby permitting suitable temperature differences to be maintained between the fluidized beds.

23 Claims, 5 Drawing Sheets

PROCESSES USING FLUIDIZED SOLIDS AND APPARATUS FOR CARRYING OUT SUCH PROCESSES

Cross-Reference to Related Applications

This application is a continuation-in-part of copending application Ser. No. 07/940,025 filed on Sep. 3, 1992, now abandoned, which is a continuation-in-part of application Ser. No. 07/746,066 filed on Aug. 12, 1991, now abandoned, which is a continuation of Ser. No. 07/406,350 filed on Sep. 13, 1989, now abandoned, all the applications having been filed in the name of Robert W. Pfeiffer and entitled "Processes Using Fluidized Solids and Apparatus for Carrying Out Such Processes"

BACKGROUND OF THE INVENTION

1. Field of the Invention

The present invention relates to a process and apparatus for carrying out reactions of the type in which particulate solids, for example, fluidizable particulate catalysts, are used to facilitate a reaction during which the particles are degraded and require regeneration. In such processes the solids are typically circulated between a reaction zone and a regeneration zone. More specifically, the present invention relates to a process and apparatus in which the temperature of the recirculated regenerated solids may be adjusted.

2. Related Art

U.S. Pat. No. 4,668,802 (R. M. Contractor) discloses a process for vapor phase catalytic oxidation of butane to maleic anhydride and various by-products over a vanadium-phosphorus oxide catalyst. As illustrated in FIGS. 1-3, and described in corresponding portions of the Patent, use of recirculating particulate solid catalysts is disclosed, including the embodiments of FIGS. 1 and 2 in which the regeneration zone is comprised of two parts, a riser section and fluid bed section.

U.S. Pat. No. 2,589,124 (J. W. Packie) discloses a method and apparatus for handling fluidized solids in the catalytic cracking of hydrocarbons. The Patent discloses circulating fluidized catalyst particles between the reactor and regeneration vessels by standpipes and transfer lines which serve as manometer-like seals while serving to circulate the fluidized catalyst between the regenerator 14 and the reactor 10, each of which contains a fluidized bed of the solid particulate catalyst. Spent catalyst withdrawn from reactor 10 is flowed downwardly through a stripper 17 which is provided with a plurality of baffles 18. Steam or other stripping gas is introduced through line 19, as explained at column 6, lines 5-12. As is well-known in the art, by occluding a portion of the vessel cross-sectional area, the baffles 18 serve to limit vertical mixing of the fluidized particles in order to enhance efficiency of the stripping operation, which is designed to remove reaction products adhering to the catalyst particles.

U.S. Pat. No. 4,388,218 (F. Rowe) discloses a process and apparatus for the regeneration of catalytic cracking catalyst particles. As illustrated in the sole Figure of the Patent, the spent catalyst particles are stripped by steam supplied through inlet 12 in a stripping section in which the chevron-shaped markings apparently indicate the presence of baffles. A pair of fluidized bed vessels, one mounted vertically above the other with separate and distinct vapor phases and with a transfer conduit therebetween (column 5, line 31 et seq), is provided for regeneration of the catalyst. As described beginning at column 6, line 59, the catalyst particles, partially regenerated in the upper regeneration zone 14, are transferred by gravity into the lower regeneration zone 21 in which regeneration is completed by burning off accumulated coke on the catalyst particles. The exothermic heat of this burning reaction is used to raise the temperature of the catalyst particles to that required for cracking the oil feed supplied to the oil reactor 1. An optional series of cooling coils 25 within zone 21 (see column 5, line 66 to column 6, line 8) is used to absorb surplus heat, if any, as described at column 7, lines 1-6, prior to recirculating the regenerated catalyst.

U.S. Pat. No. 3,563,911 (R. W. Pfeiffer et al) and U.S. Pat. No. 3,661,800 (R. W. Pfeiffer et al) both show staged fluidized catalyst regeneration processes. Patent No. 3,563,911 shows a fluidized bed of catalyst in a regenerator divided into two side-by-side sections, numbered 4 and 6 in FIG. 1, by an arched baffle 3 which is provided with weirs 8. Patent No. 3,661,800 shows a staged regenerator in which the two portions of the bed of regenerated catalyst are divided by a baffle means into two sections, one above the other. Specifically, FIG. 2 of Patent No. 3,661,800 shows a reduced-diameter extension 102 of the regenerator vessel which includes a doughnut baffle 103 (and may include additional baffles, not shown) to ensure that no significant backmixing of catalyst occurs. See column 8, lines 58-75.

SUMMARY OF THE INVENTION

In accordance with the present invention, there is provided an improvement in a process for carrying out a chemical reaction in a reaction zone to which a reactant feed and particulate solids are introduced under reaction conditions, the establishment of which is facilitated by the presence of the solids, and in which the reaction results in the degradation of the solids. The process includes (i) withdrawing from the reaction zone reaction product and the degraded particulate solids, (ii) separating the degraded solids from the reaction product, (iii) transferring the separated, degraded solids to a regeneration zone for regeneration of the solids in a fluidized bed of the solids, and (iv) withdrawing the regenerated solids from the regeneration zone and returning them to the reaction zone. The improvement provided by the present invention is that (a) the regeneration zone fluidized bed is divided by horizontally-disposed occlusion means disposed in an occlusion zone into an uppermost fluidized bed zone and at least one lower fluidized bed zone, and (b) the process includes the following steps: maintaining the regeneration zone fluidized bed so that it extends continuously through the uppermost bed zone, the occlusion zone and the lower bed zone; flowing the degraded solids into the uppermost bed zone and therein at least partially regenerating the solids by carrying out a regeneration reaction. Thereafter, the solids are flowed through the occlusion zone and the lower bed zone and, optionally, further regeneration is carried out in one or both of the occlusion and lower bed zones. The regenerated solids are then withdrawn from the lower bed zone and returned to the reaction zone. A heat exchange medium is flowed through one or both of the occlusion zone and the lower bed zone in heat exchange with the portion of the regeneration zone fluidized bed contained therein.

In one aspect of the present invention, the heat exchange medium may comprise a coolant which is flowed through at least one of the occlusion zone and the lower bed zone to remove heat from the fluidized bed. The coolant may comprise air, some or all of which may optionally be supplied to the regeneration zone to aid in regenerating the catalyst particles.

In one aspect of the present invention, the process comprises the catalytic cracking of hydrocarbon feedstock and the solids comprise a fluidizable catalytic cracking catalyst, the degradation of which is caused by the adherence of carbonaceous deposits thereon. In such case, the regeneration comprises oxidizing the carbonaceous deposits at least in the uppermost bed zone and, optionally, in the occlusion and lower bed zones.

In another aspect of the present invention, the chemical reaction is the catalytic oxidation of butane to maleic anhydride and the solids comprise a fluidizable particulate catalyst therefor, the degradation of which is caused by reduction of the catalyst. In this case, the regeneration comprises oxidizing the catalyst at least in the uppermost bed zone and, optionally, in the occlusion and lower bed zones.

In any case, heat exchange in the regeneration zone, e.g., heat removal from the solids, may be accomplished by indirect heat exchange, by flowing the coolant through cooling tubes in the regeneration zone. For example, in the embodiment in which the occlusion means comprises heat-removal tubes, heat removal may be accomplished by flowing a coolant fluid through the occlusion means. In one embodiment, this may be accomplished by providing occlusion means in the form of heat exchange tubes with air distribution orifices, and flowing air through the heat exchange tubes and orifices to add regeneration air directly to the bed. Heat may also be removed by flowing coolant fluid through an indirect heat exchanger in the lower bed zone, regardless of whether the occlusion means comprises heat-removal tubes or a plurality of baffles. Alternatively, heat removal may be at least partially accomplished by introducing a cooling gas into the lower bed regeneration zone, in direct contact with the solids.

In accordance with the present invention, there is also provided an apparatus for carrying out a chemical reaction in which a reactant feed and particulate solids are contacted under reaction conditions, the establishment of which is facilitated by the presence of the solids, which reaction results in the degradation of the solids. Such apparatus comprises (a) a reaction vessel defining the reaction zone; (b) a regeneration vessel defining the regeneration zone; and (c) conduit means connecting the reaction vessel and the regeneration vessel in fluidized solids flow communication for circulation of fluidized solids between the reaction zone of the reaction vessel and the regeneration zone of the regeneration vessel. The improvement of the present invention provides that the regeneration zone comprises a fluidized solids bed zone comprising a horizontally-disposed occlusion means defining an occlusion zone dimensioned and configured so that a fluidized bed of the particulate solids is maintainable therein, the occlusion zone dividing the fluidized solids bed zone into an uppermost fluidized bed zone and at least one lower fluidized bed zone, the uppermost bed zone and the at least one lower bed zone both being contiguous with the occlusion zone, the occlusion zone being dimensioned and configured to permit the passage therethrough of a fluidized bed of the particulate solids; the conduit means being dimensioned and configured to flow degraded solids from the reaction vessel into the uppermost bed zone and to flow regenerated solids from the lower bed zone into the reaction vessel; and the apparatus further comprising heat exchange means disposed within at least one of the lower bed zone and the occlusion zone.

According to one aspect of the invention, the heat exchange means is disposed at least in the lower bed zone and may comprise indirect heat exchange means having conduit means connected thereto for passage of a heat exchange medium through the indirect heat exchange means.

In another aspect of the invention, the heat exchange means may be integral with the occlusion means and comprise at least one heat exchange tube having conduit means connected thereto for passage of a heat exchange medium therethrough. In such embodiments, heat exchange, e.g., heat removal, may be accomplished by flowing a heat exchange medium, e.g., coolant fluid, through the heat exchange means to effect indirect heat transfer between the fluidized solids bed and the heat exchange medium. The heat exchange medium may comprise air, and in the occlusion zone the heat exchange means may include distribution orifices for introducing air into the regeneration zone.

In another aspect of the present invention, the occlusion means comprises a plurality of baffles disposed horizontally across the occlusion zone of the regeneration vessel and are arranged in a vertically-extending array of two or more tiers of baffles.

In one aspect of the present invention, the occlusion means occlude from about 15% to 85% of the cross-sectional flow area between the uppermost bed zone and the lower bed zone. For example, the occlusion means may occlude from about 25% to 60% of the cross-sectional flow area between the uppermost bed zone and the lower bed zone.

Other aspects of the invention are set forth in the drawings and the following detailed description.

DETAILED DESCRIPTION OF THE INVENTION AND PREFERRED EMBODIMENTS THEREOF

Figure 1:
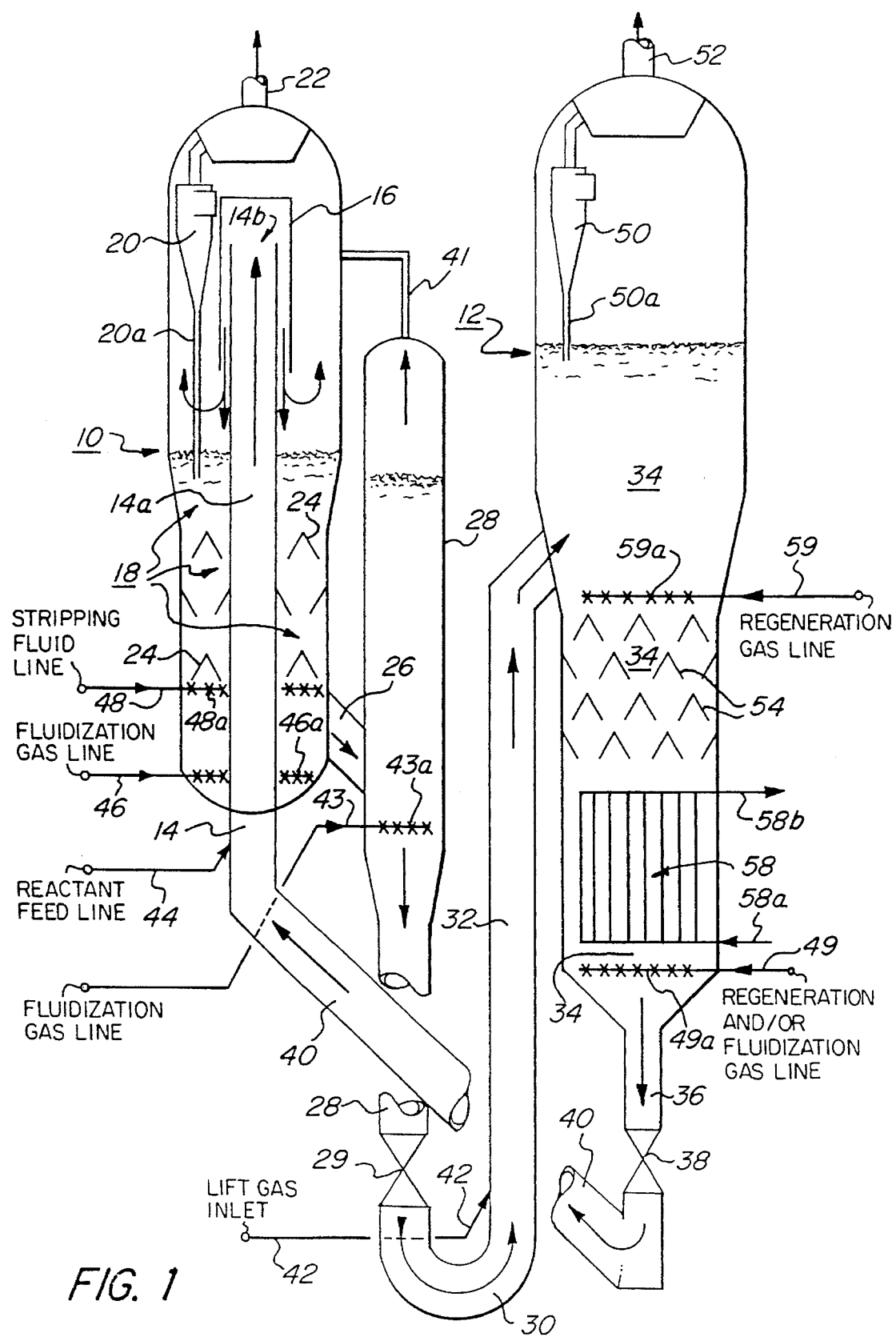
FIG. 1 is a schematic cross-sectional view in elevation of an apparatus comprising one embodiment of the present invention.

Referring now to FIG. 1 of the drawings, there is schematically illustrated an apparatus for carrying out a chemical reaction, the apparatus comprising a reaction vessel 10 and a regeneration vessel 12 interconnected in fluidized solids flow communication by conduit means. In the illustrated embodiment, the conduit means comprises a reactor riser 14 having a portion 14a thereof which extends coaxially within reaction vessel 10 and therein terminates at its open end 14b. The upper part of portion 14a is capped by a reactor riser separator 16 which fits thereover to deflect the flow of fluidized solids downwardly within reaction vessel 10, as indicated by the unnumbered flow direction arrows therein. Reactor riser separator 16 effectuates a gas-solids separation, as well-known to those skilled in the art, so as to drop particulate solids into the fluidized bed of solids 18 maintained within reaction vessel 10. The gas in which the particulate solids were entrained flows upwardly as indicated by the upwardly curved flow direction arrows, thence through a cyclone separator 20, which separates most of the remaining entrained particulates and fines within the gas stream, and permits the product gases to flow outwardly through product outlet conduit 22 for further processing. Particulate fines detrained by separator 20 are deposited via dip leg 20a into fluidized bed 18. A plurality of baffles 24 is mounted within the fluidized bed zone of reaction vessel 10, in order to limit vertical backmixing of the solid particles, which enhances the efficiency of stripping the particles, as described in more detail below. The use of such baffles 24 is well-known to those skilled in the art.

A withdrawal conduit 26 is connected adjacent the lower end of reaction vessel 10 for withdrawal of spent catalyst from fluidized bed 18 via an external withdrawal well 28, past a throttling valve 29 and then through an elbow section 30 to a spent catalyst riser 32, which discharges into regeneration vessel 12. A fluidized catalyst bed 34 defines a fluidized solids regeneration bed zone below the dilute vapor-phase portion of regeneration vessel 12. The degraded solids, for example, spent catalyst particles, pass downwardly through the fluidized solids regeneration bed zone 34, within which the solids are regenerated as described below, and exit from regeneration vessel 12 via a standpipe 36, then past a throttling valve 38 and upwardly, as indicated by the unnumbered flow direction arrows, into a lateral connector 40 for return of the regenerated solids to reactor riser 14, thence into fluidized bed 18.

It will thus be appreciated that the conduit means connecting reaction vessel 10 to regeneration vessel 12 for recirculation of particulate solids therebetween is comprised of, in the illustrated embodiment, reactor riser 14, including portion 14a thereof, withdrawal conduit 26 and withdrawal well 28, valve 29, elbow section 30, spent catalyst riser 32, standpipe 36, valve 38 and lateral connector 40.

A connector line 41 connects the upper portion of reaction vessel 10 in gas flow communication with the upper portion of withdrawal well 28 to balance the pressures therein, in a manner well-known to those skilled in the art.

Figure 2:
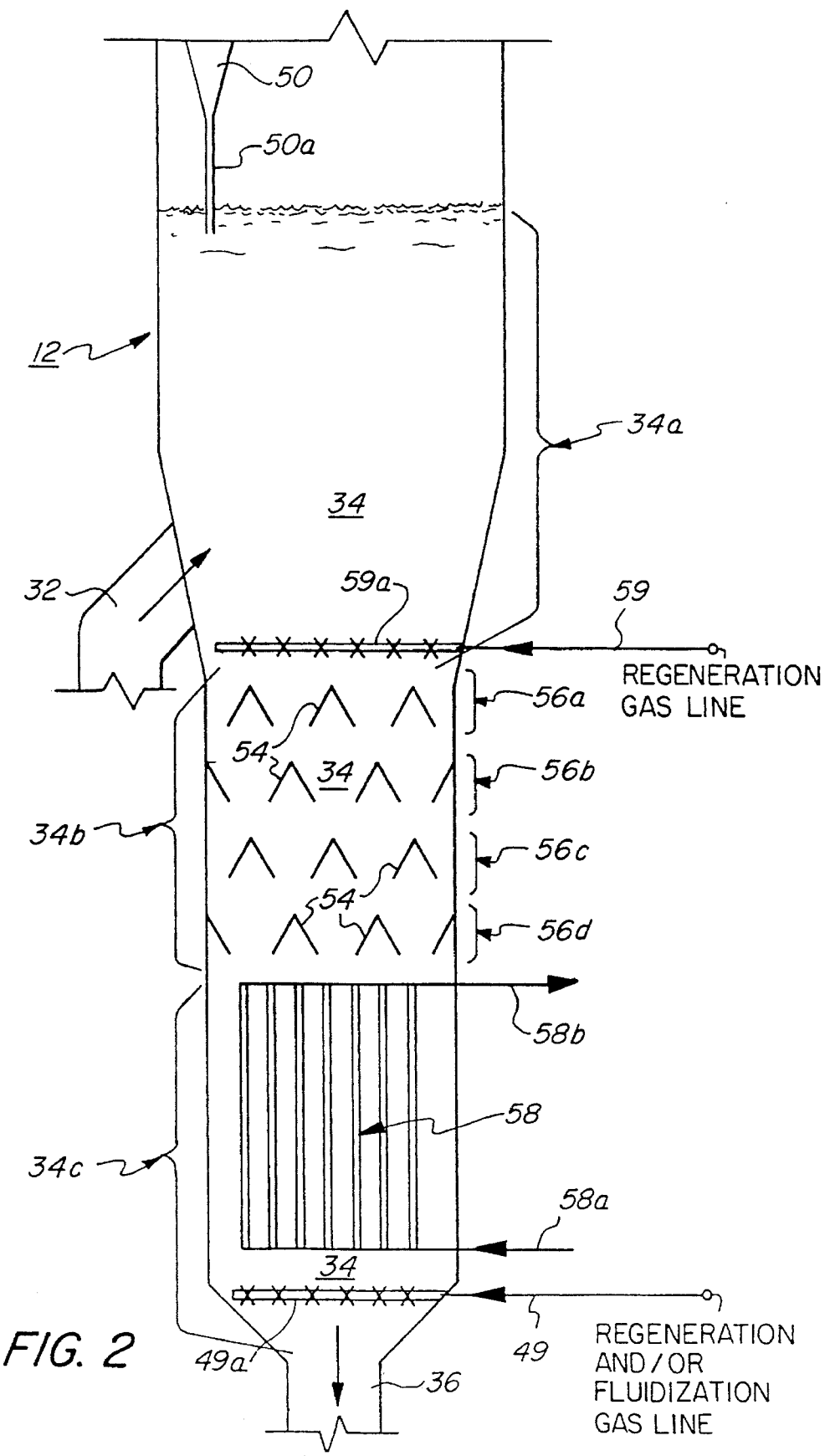
FIG. 2 is a view on a scale enlarged with respect to FIG. 1 of the regeneration bed portion of the regeneration vessel shown in FIG. 1.

A number of gas or fluid lines are connected in fluid flow communication as follows: a lift gas inlet line 42 is connected at the lower end of spent catalyst riser 32; a fluidization gas line 43 is connected to an associated distributor ring 43a disposed within the lower portion of withdrawal well 28; a reactant feed line 44 is connected to a lower portion of reactor riser 14; a fluidization gas line 46 is connected to a distributor ring 46a located within reaction vessel 10 adjacent the lower end thereof; a stripping fluid line 48 is connected to its distribution ring 48a also located within reaction vessel 10, above ring 46a and above the connection point of withdrawal conduit 26 to reaction vessel 10; a regeneration and/or fluidization gas inlet 49 is connected in flow communication to an associated distributor ring 49a therefor located within the lower end of regeneration vessel 12; and a regeneration air inlet 59 is connected in flow communication to a distribution ring 59a thereof which is located within regeneration vessel 12 at the lower end of uppermost regeneration bed zone 34a (FIG. 2). In some cases, inlet 49 may be used to introduce additional regeneration gas, for example, in two-stage regeneration.

A cyclone separator 50 is disposed within regeneration vessel 12 at the upper end thereof and is connected in gas flow communication with a regeneration flue gas outlet 52. A dip leg 50a extends from cyclone separator 50 into fluidized catalyst bed 34. As is well-known to those skilled in the art, cyclone separator 50 serves to separate solid particles and fines from the flue gas exiting regeneration vessel 12 and return them via dip leg 50a, to catalyst bed 34.

Figure 2A:
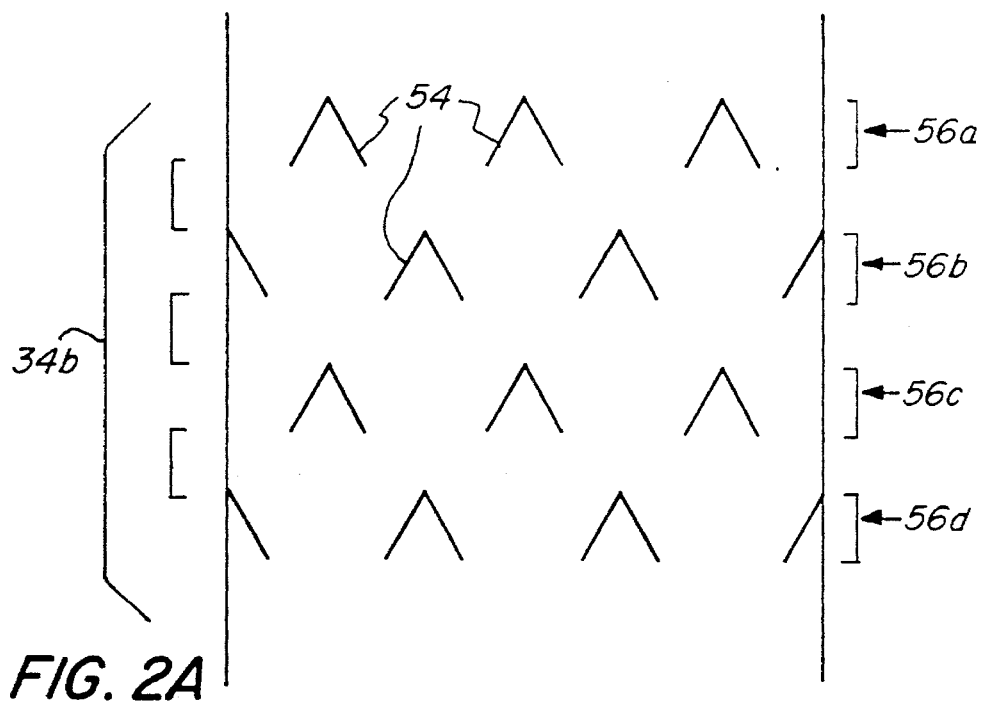
FIG. 2A is a view on a scale enlarged with respect to FIG. 2 of the occlusion zone of FIG. 2.

As best seen in the enlarged scale views of FIGS. 2 and 2A, there is disposed within regeneration vessel 12, at a vertically intermediate location within the regeneration bed zone defined by catalyst bed 34, a plurality of baffles 54 arranged in a vertically arranged stack of four layers or tiers 56a, 56b, 56c and 56d, each of these tiers comprising a horizontally-disposed plurality of individual baffles 54. The resultant array of baffles defines an occlusion zone 34b which divides the regeneration bed zone into an uppermost fluidized bed zone 34a and a lower fluidized bed and/or heat-removal zone 34c. Obviously, any desired number and arrangement of suitable baffles may be employed in a given case. The uppermost fluidized bed zone 34a, the occlusion zone 34b and the lower fluidized bed zone 34c are contiguous and so dimensioned and configured that a fluidized bed may be maintained therein which extends continuously through the three zones 34a, 34b and 34c.

Figure 2B:
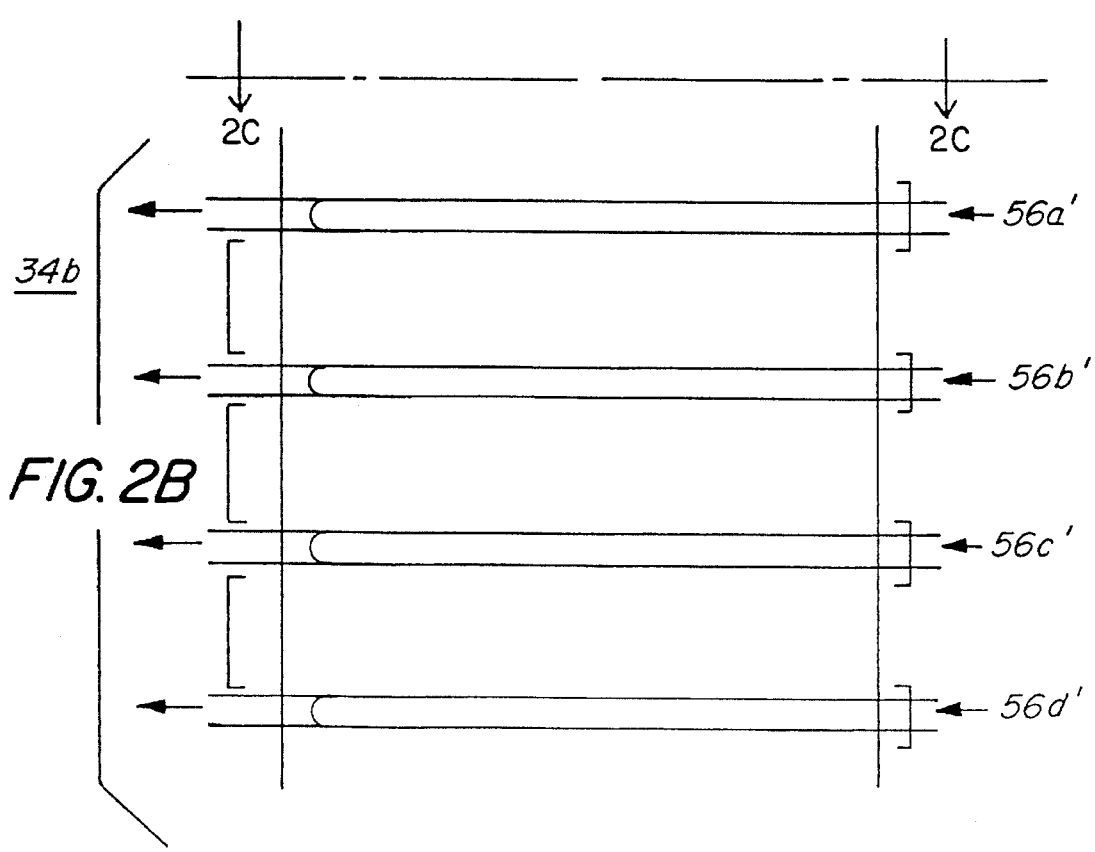
FIG. 2B is a view similar to FIG. 2A of an alternative embodiment comprising heat-removal tubes as occlusion means.
Figure 2C:
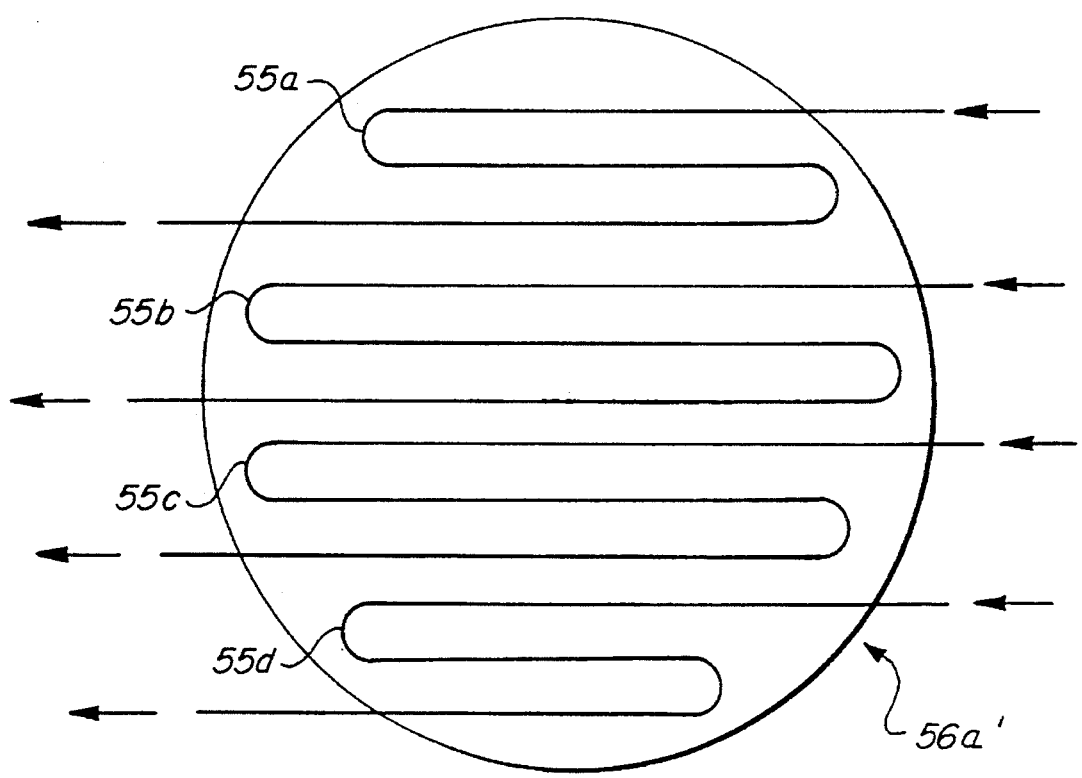
FIG. 2C is a schematic view of one tier of the occlusion means of FIG. 2B.

In an alternative embodiment, the occlusion means may comprise horizontally-disposed heat exchange tubes, as seen in FIG. 2B. In this embodiment, each tier 56a', 56b', 56c' and 56d' comprises at least one heat exchange tube horizontally-disposed in occlusion zone 34b. As best illustrated in FIG. 2C, a tier such as tier 56a' may comprise a row of heat exchange tubes, e.g., heat exchange tubes 55a, 55b, 55c and 55d. Each heat exchange tube is configured to allow a fluid heat exchange medium such as a coolant (e.g., low temperature steam or boiler feed water or combustion air) to flow therein so that the heat exchange medium can flow through the occlusion zone (as indicated by the arrows in FIG. 2B) to add or withdraw heat from the regeneration zone 34. Each heat exchange tube in the occlusion zone may follow a serpentine path within its respective tier, as shown in FIG. 2C. Heat exchange tubes 55a–d each may be connected to conduit means to flow coolant fluid through the respective heat-removal tube, as discussed below with respect to heat exchanger 58. Alternatively, tubes 55a–d may be connected in series-flow to form one continuous "U-tube" design, which would facilitate having the inlet and outlet headers for all four tiers 56a'–d' on the same side of the vessel. In a heat balanced fluidized catalytic cracking unit, heat removal from the regenerated catalyst particles permits changing the catalyst to oil ratio in the reaction zone to optimize yields of the desired distillates, e.g., gasoline.

The heat exchange tubes comprise inlets and outlets for flowing fluid heat exchange media therethrough as is well-known to those skilled in the art. However, the use of heat exchange tubes as occlusion means does not mandate heat exchange such as heat removal in the occlusion zone; heat exchange may be performed or not, depending on the preferred operational conditions in a given process. When the heat exchange tubes are not used to add or remove heat, the preferred serpentine configuration of the heat exchange tubes in the occlusion zone mitigates structural stress caused by thermal expansion and contraction of the tubes.

Figure 3:
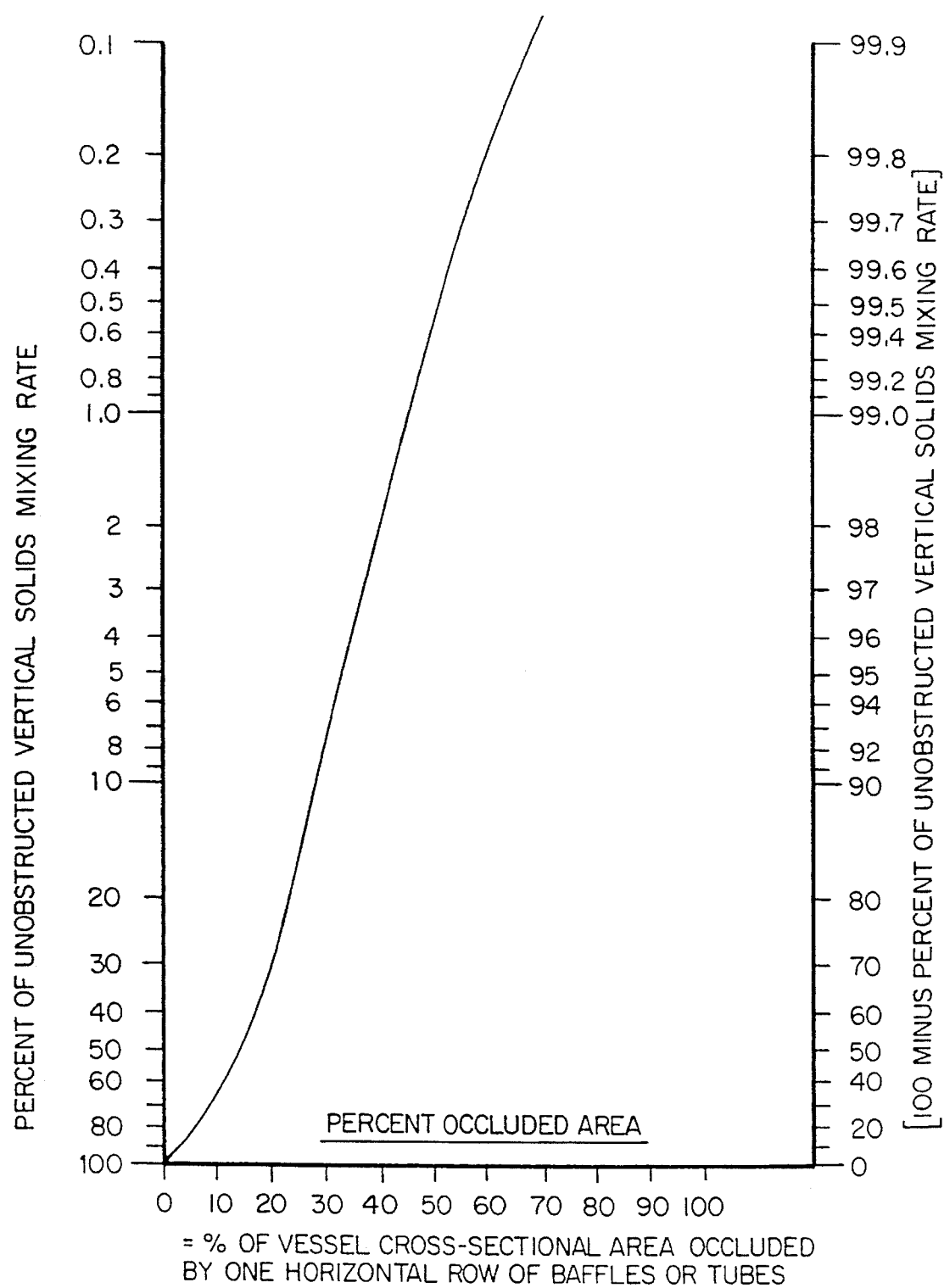
FIG. 3 is a graph showing the effect of one row of horizontally-disposed baffles or tubes in reducing vertical solids mixing rate within a fluid bed, as a function of the occluded cross-sectional area of the vessel occupied by the one row of baffles or tubes.

The reduction in backmixing accomplished by each tier (i.e., horizontal row) of the occlusion means, whether baffles or tubes, may be estimated by the use of FIG. 3, which applies to the type of solids and superficial gas velocities (e.g., about 2 ft/sec.) typical of fluid catalytic cracking, maleic anhydride and many other fluid processes. As an example, one row of tubes covering only 25% of the cross-sectional area of the vessel will reduce the solids backmixing to only about 16% of the unobstructed vertical solids mixing rate. In moving upward past a baffle or heat exchange tube in the occlusion zone, the fluidized bed exhibits an increased gas velocity. Preferably, there is sufficient vertical space from one tier to the next of the occlusion means to allow the region of high velocity to abate, so that the movement of the gaseous medium and the bed approximates unobstructed flow, i.e., there is re-establishment of the normal "bubbling-bed", before the up-flowing gas and down-flowing bed solids encounter the next respective succeeding tiers. It may also be convenient to provide sufficient space between tiers to allow access by maintenance personnel. When the occlusion means comprises tubes having a three inch diameter, a separation between tiers of about 18 inches (45.7 cm) is typically sufficient to allow for both restoration of the bubbling bed (i.e., of unobstructed flow) and access for maintenance, although variations will be dictated by the baffle or tube width, the speed and density of the bed, the size of the particles, etc. Two rows of occlusion means vertically separated about 18 inches (45.7 cm) would thus reduce the mixing rate to 16%×16% =2.56%; and four rows to $(16\%)^4$= 0.066%. It is thus demonstrated that essentially all of the advantages of staged regeneration resulting from totally separate vessels or fluidized beds may be achieved within one contiguous bed. The reduction in mixing rate achieved by a given degree of occlusion between the uppermost bed zone and the lower bed zone varies with the velocity of the fluidized bed, with higher superficial gas velocities exhibiting greater effective reduction in percentage of unrestricted backmixing for a given percent of occlusion of the cross-sectional flow area between the uppermost and lower zones.

A further advantage of the present invention in regeneration of fluid catalyst is the reduced burning rate and commensurate lower peak particle temperatures resulting from the lower partial pressure of oxygen (pp$O_2$) in the uppermost bed into which the particles having the highest carbon content are introduced. This advantage of reduced burning rate is additional to the known advantages of staged regeneration wherein the temperature of the first stage is reduced as compared to single stage regeneration, and results from providing regeneration gas inlets in two vertically disposed locations, i.e., uppermost bed regeneration air inlet 59 and lower bed regeneration fluid line 49. By dividing the regeneration gas supply in this way, the pp$O_2$ in the uppermost bed zone is reduced, i.e., flue gases exiting the lower bed enter the uppermost bed at a reduced oxygen level, thus lowering the overall pp$O_2$ entering the bottom of the uppermost bed as well as lowering the average pp$O_2$ in the uppermost bed.

Disposed within lower regeneration bed zone 34c is an optional heat exchanger 58 which is connected in fluid flow communication to a coolant fluid inlet 58a and a coolant fluid outlet 58b. The heat exchanger 58 may be of any suitable construction such as a coil or coils, or a tube and header arrangement as schematically illustrated wherein the tubes may be vertically-disposed so as not to impede vertical backmixing within zone 34c. In other embodiments of the present invention, the coils or tubes in heat exchanger 58 may be horizontally-disposed, as are the baffles, heat-removal tubes or other occlusion means in the occlusion zone. In such case, however, the mixing of the catalyst particles within the lower bed zone is impeded.

In operation (referring again to FIG. 1), a reactant feed is introduced through reactant feed line 44 into reactor riser 14. For example, the reactant feed may comprise a suitable hydrocarbon feedstock which is to be subjected to fluid catalytic cracking. Any suitable fluidizable catalytic cracking particulate catalyst is used and is circulated upwardly through reactor riser 14 and enclosed portion 14a thereof. The catalyst is at an elevated temperature and the hydrocarbon feed is consequently substantially vaporized and, in the vapor phase, is cracked within reactor riser 14 to produce a product gas which, together with the entrained fluidized catalyst particles, exits open end 14b of reactor riser 14, and is deflected by reactor riser separator 16 with the product gas exiting via cyclone separator 20 and product outlet conduit 22. The spent catalyst drops downwardly by gravity into fluidized bed 18 and flows downwardly past baffles 24 in countercurrent contact flow with stripping steam introduced through stripping fluid line 48. Fluidization gas is introduced through fluidization gas line 46 and its associated distribution ring 46a and serves to maintain the lower portion of bed 18 in a fluidized condition. The stripped, spent catalyst is withdrawn through withdrawal conduit 26 into external withdrawal well 28, the catalyst therein being fluidized by a gaseous fluid introduced through line 43 and distributor ring 43a. The catalyst flows downwardly past throttling valve 29 through elbow section 30 and upwardly through spent catalyst riser 32 for introduction into regeneration vessel 12 within catalyst bed 34, more specifically within uppermost fluidized bed zone 34a thereof.

As shown in FIG. 2, regeneration air is introduced into zone 34a through regeneration air inlet 59 and its associated distribution ring 59a to oxidize the carbonaceous accretions on the catalyst particles, thereby regenerating the catalyst in a manner well-known to those skilled in the art. Fluidization gas and/or regeneration air can be added into zone 34c through line 49, to increase the regeneration rate in the lower bed zone. The resultant combustion flue gases exit via cyclone separator 50 and regeneration flue gas outlet 52. Particulates and fines entrained in the regeneration flue gas are separated by cyclone separator 50 and are returned to the uppermost bed zone 34a via dip leg 50a. The hot, regenerated catalyst particles flow downwardly through occlusion zone 34b, wherein the occlusion means, e.g., baffles 54, serve to limit vertical backmixing of the catalyst particles, thereby minimizing solids back-flow, i.e., upward movement of the solids, to provide an effective segregation of particles between uppermost fluidized bed zone 34a and lower fluidized bed zone 34c. As the particles, at an elevated temperature from the regeneration burning which took place in uppermost bed zone 34a, flow downwardly through occlusion zone 34b thence into lower bed zone 34c, they flow around the heat-removal coils or tubes comprising heat exchanger 58. Surplus heat is thereby extracted from the particulates by means of the coolant fluid flowed into exchanger 58 through inlet 58a and withdrawn via outlet 58b. The apparatus and processes of the invention thus combine the well-known advantages of two-stage regeneration in a single contiguous bed (e.g., zones 34a, 34b and 34c) with the ability to effectively modify the temperature of the outlet regenerated solids. The regenerated catalyst particles flow downwardly through standpipe 36 past throttling valve 38, thence via lateral connector 40 for return of the regenerated catalyst to reactor riser 14. A regeneration and/or fluidization gas, such as air or steam, is introduced via regeneration and/or fluidization gas inlet 49 and its associated distribution ring 49a in order to maintain the lower portion of catalyst bed 34 in a fluidized condition.

It will be appreciated by those skilled in the art that a regeneration vessel according to the present invention may comprise a plurality of occlusion zones establishing within the fluidized bed three or more segregated bed zones within which bubbling beds of fluidized catalyst particles can exist at various temperatures, thus providing a plurality of staged zones within a single regeneration vessel containing a single, contiguous bed.

It will be appreciated as well by those skilled in the art that numerous items of structural and operating equipment and details thereof have been omitted from the schematic illustration of the Figures inasmuch as such are well-known to those skilled in the art, form no part of the present invention, and their ommission simplifies the Figures.

It will further be apparent to those skilled in the art that the apparatus and processes of the present invention are equally applicable for other processes such as, for example, the oxidation of butane with oxygen, with oxygen provided by air or oxygen-enriched air, to maleic anhydride. In such case, the catalyst will be a suitable oxidation catalyst such as that disclosed in the aforementioned Contractor Patent, which catalyst is reduced during the reaction phase. In such case, the regeneration which occurs in uppermost bed zone 34a is oxidation of the catalyst.

Regardless of the type of reaction or process being carried out, any process characterized by regeneration of a recirculating solid particulate catalyst may be handled in accordance with the broad teachings of the present invention. The present invention provides that a single catalyst bed may be divided into zones segregated by suitable occlusion means disposed in one or more occlusion zones to provide a partially occluded flow path between the zones, e.g., between an uppermost bed zone and a lower bed zone of the fluidized regeneration bed. The lower bed zone may thus be maintained at a different temperature than the uppermost bed zone. That is, the occlusion means segregates portions of a single, continuous fluidized bed sufficiently to permit the maintenance of desired temperature differences between the segregated portions of the bed. Specifically, the portion of the fluidized bed above the occlusion means may be maintained at a suitably high regeneration temperature, and heat exchange, such as by indirect heat exchange, may be carried out within and/or below the intermediate occlusion zone to maintain catalyst flowed from the lower regeneration zone at a desired temperature different from the regeneration temperature in the uppermost zone. The present invention enables the maintenance of a substantial temperature difference, if desired, over a fluidized catalyst bed in a single vessel without the necessity or expense of maintaining two separate catalyst regeneration vessels, by using one or more occlusion zones to inhibit backmixing of the catalyst and thereby impose an essentially net one-way direction of travel of catalyst through the occlusion zone or zones within the single regeneration vessel. Thus, the catalyst particles in one zone of a fluidized bed can effectively be segregated from particles in other zones within the fluidized bed. Accordingly, these particles in the various segregated zones can be maintained at different respective temperatures.

The occlusion means which segregates, e.g., uppermost and lower zones of the fluidized bed, may occlude from about 15 to 85 percent of the cross-sectional flow area between the segregated zones, for example, the occlusion may be about 25 percent to 60 percent, e.g., 50 percent. The extent of occlusion selected may depend upon the maximum gas velocities permitted as the gas flows past the baffles or tubes; e.g., if the maximum permitted gas velocity past the baffles or tubes is 3.0 ft/sec., and the superficial gas velocity from the zone below is already 2.5 ft/sec., then the occluded area cannot exceed $$100 [1-(2.5/3.0)]=16.7\%$$

If, however, the gas velocity from the zone below were only 1.5 ft/sec. then the occluded area could increase to $$100 [1-(1.5/3.0)]=50\%$$

While the invention has been described in detail with respect to specific preferred embodiments thereof, it will be appreciated that numerous variations thereto may occur to those skilled in the art upon a reading and understanding of the foregoing, and it is intended to include such variations within the scope of the appended claims.

What is claimed is:

1. In a process for carrying out a chemical reaction in a reaction zone to which a reactant feed and particulate solids are introduced under reaction conditions, the establishment of which is facilitated by the presence of the solids, which reaction results in the degradation of the solids, the process including (i) withdrawing from the reaction zone reaction product and the degraded particulate solids, (ii) separating the degraded solids from the reaction product, (iii) transferring the separated, degraded solids to a regeneration zone for regeneration of the solids in a fluidized bed of the solids, and (iv) withdrawing the regenerated solids from the regeneration zone and returning them to the reaction zone, the improvement comprising:

(a) maintaining the regeneration zone fluidized bed as at least three distinct, contiguous zones comprising an uppermost fluidized bed zone, at least one intermediate occlusion zone defined by horizontally-disposed occlusion means, and at least one lower fluidized bed zone, with the regeneration zone fluidized bed extending continuously through the uppermost bed zone, the occlusion zone and the lower bed zone; and (b) flowing the degraded solids into the uppermost bed zone and therein at least partially regenerating the solids by carrying out a regeneration reaction, thereafter flowing the solids through the occlusion zone and the lower bed zone, withdrawing the regenerated solids from the lower bed zone and returning them to the reaction zone, and flowing a head exchange medium through heat exchange means located in at least one of the occlusion zone and the lower bed zone in heat exchange with the portion of the regeneration zone fluidized bed contained therein.

2. The process of claim 1 wherein the heat exchange medium is a coolant and further comprising flowing the coolant through at least one of the occlusion zone and the lower bed zone to remove heat from the fluidized bed.

3. The process of claim 2 wherein removing heat from the fluidized bed comprises flowing coolant through an indirect heat exchanger disposed within the lower bed zone.

4. The process of claim 1 or claim 2 wherein the occlusion means comprises at least one horizontally-disposed heat exchange tube.

5. The process of claim 4 further comprising removing heat from the solids by flowing coolant through the at least one heat exchange tube of the occlusion means.

6. The process of claim 2 wherein the coolant comprises air and further comprising supplying at least some of the air to the regeneration zone.

7. The process of claim 1 wherein the process comprises the catalytic cracking of hydrocarbon feedstock and the solids comprise a fluidizable catalytic cracking catalyst, and wherein the degradation is caused by the adherence of carbonaceous deposits to the catalyst and the regeneration comprises oxidizing the carbonaceous deposits at least in the uppermost bed zone.

8. The process of claim 7 further including oxidizing the carbonaceous deposits in the occlusion and lower bed zones.

9. The process of claim 1 wherein the chemical reaction is the catalytic oxidation of butane to maleic anhydride, the solids comprise a fluidizable particulate catalyst therefor, wherein the degradation is caused by reduction of the catalyst, and the regeneration comprises oxidizing the catalyst at least in the uppermost bed zone.

10. The process of claim 9 further including oxidizing the catalyst in the occlusion and lower bed zones.

11. The process of claim 1 wherein the occlusion means comprises a plurality of horizontally-disposed baffles.

12. The process of claim 1, claim 2, claim 7 or claim 11 further comprising further regenerating the catalyst particles in the occlusion zone.

13. The process of claim 1 including carrying out further regeneration in at least one of the occlusion and the lower bed zones.

14. The process of claim 1, claim 2 or claim 13 including maintaining in the regeneration zone fluidized bed a plurality of the occlusion zones and a plurality of the lower fluidized bed zones.

15. In an apparatus for carrying out a chemical reaction in which a reactant feed and particulate solids are contacted under reaction conditions, the establishment of which is facilitated by the presence of the solids, which reaction results in the degradation of the solids, the apparatus comprising (a) a reaction vessel defining a reaction zone; (b) a regeneration vessel defining a regeneration zone; and (c) conduit means connecting the reaction vessel and the regeneration vessel in fluid communication for circulation of fluidized solids between the reaction zone of the reaction vessel and the regeneration zone of the regeneration vessel; the improvement comprising:

the regeneration zone comprises a fluidized solids bed zone divided into at least three distinct, contiguous zones by horizontally-disposed occlusion means defining at least one occlusion zone dimensioned and configured so that a continuous fluidized bed of the particulate solids is maintainable through the at least three zones, the occlusion zone dividing the fluidized solids bed zone into an uppermost fluidized bed zone and at least one lower fluidized bed zone, the uppermost bed zone and the at least one lower bed zone both being contiguous with the occlusion zone, the occlusion zone being dimensioned and configured to permit the passage therethrough of a fluidized bed of the particulate solids; the conduit means being dimensioned and configured to flow degraded solids from the reaction vessel into the uppermost bed zone and to flow regenerated solids from the lower bed zone into the reaction vessel; and the apparatus further comprising heat exchange means disposed within at least one of the lower bed zone and the occlusion zone.

16. The apparatus of claim 15 wherein the heat exchange means is disposed at least in the lower bed zone and comprises an indirect heat exchange means having conduit means connected thereto for passage of a heat exchange medium through the indirect heat exchange means.

17. The apparatus of claim 15 wherein the heat exchange means is integral with the occlusion means and comprises at least one heat exchange tube having conduit means connected thereto for passage of a heat exchange medium fluid therethrough.

18. The apparatus of claim 17 wherein the at least one heat exchange tube carries coolant air and has distribution orifices for introducing air into the regeneration zone from within the tube.

19. The apparatus of claim 17 further comprising heat exchange means in the lower bed zone.

20. The apparatus of claim 15 wherein the occlusion means comprises a plurality of baffles disposed horizontally across the occlusion zone of the regeneration vessel and are arranged in a vertically-extending array of two or more tiers of baffles.

21. The apparatus of claim 15 wherein the occlusion means occlude from about 15 percent to 85 percent of the cross-sectional flow area between the uppermost bed zone and the lower bed zone.

22. The apparatus of claim 15 wherein the occlusion means occlude from about 25 percent to 60 percent of the cross-sectional flow area between the uppermost bed zone and the lower bed zone.

23. The apparatus of claim 15, claim 16, claim 17 or claim 20 comprising a plurality of the occlusion means defining a plurality of the occlusion zones and a plurality of lower fluidized bed zones.

* * * * *

UNITED STATES PATENT AND TRADEMARK OFFICE
CERTIFICATE OF CORRECTION

PATENT NO.  : 5,462,717
DATED       : October 31, 1995
INVENTOR(S) : Robert W. Pfeiffer It is certified that error appears in the above-indentified patent and that said Letters Patent is hereby corrected as shown below:

In claim 1, column 10, line 46, replace "head" with --heat--.

Signed and Sealed this

Twenty-seventh Day of August, 1996

Attest:

BRUCE LEHMAN

Attesting Officer            Commissioner of Patents and Trademarks